United States Patent [19]

Kleinhans

[11] Patent Number: 4,845,394

[45] Date of Patent: Jul. 4, 1989

[54] ELECTRIC MACHINE WITH A CLOSED COOLING LOOP

[75] Inventor: Siegfried Kleinhans, Berlin, Fed. Rep. of Germany

[73] Assignee: Siemens Aktiengesellschaft, Berlin and Munich, Fed. Rep. of Germany

[21] Appl. No.: 208,402

[22] Filed: Jun. 17, 1988

[30] Foreign Application Priority Data

Jul. 17, 1987 [DE] Fed. Rep. of Germany ....... 3724186

[51] Int. Cl.⁴ .............................................. H02K 9/00
[52] U.S. Cl. ...................................... 310/64; 310/59; 165/903
[58] Field of Search ....................... 310/64, 254, 65, 89, 310/62, 63, 58, 59, 52, 42; 165/104.34, 903

[56] References Cited

U.S. PATENT DOCUMENTS

| | | | |
|---|---|---|---|
| 2,650,313 | 8/1953 | Wiedemann | 310/57 |
| 4,208,599 | 6/1980 | Armor | 310/64 |
| 4,264,834 | 4/1981 | Armor | 310/59 |
| 4,609,840 | 9/1986 | Eats | 310/58 |

FOREIGN PATENT DOCUMENTS

| | | | |
|---|---|---|---|
| 0046315 | 2/1982 | European Pat. Off. | 310/64 |
| 1058619 | 6/1959 | Fed. Rep. of Germany . | |
| 1065074 | 9/1959 | Fed. Rep. of Germany . | |
| 2724422 | 12/1977 | Fed. Rep. of Germany . | |
| 2854712 | 7/1980 | Fed. Rep. of Germany . | |
| 2944751 | 5/1981 | Fed. Rep. of Germany | 310/64 |
| 0061448 | 4/1984 | Japan . | |
| 59-61448 | 7/1984 | Japan . | |
| 0838922 | 6/1981 | U.S.S.R. | 310/64 |

OTHER PUBLICATIONS

Page 14 of German Standards Publication, Graphic Symbols; DIN, 1946, Part 1.

*Primary Examiner*—R. Skudy
*Attorney, Agent, or Firm*—Kenyon & Kenyon

[57] ABSTRACT

In gas-cooled electric machines with a closed cooling loop which is distributed over two heat exchangers, arranged on the upper or under side of the machine, only part of the circulating cooling gas is cooled so that the electric machine must be taken out of operation because of the danger of local ovewrheating. In order to overcome this, baffles are arranged adjacent to the heat exchangers so as to block the cooling gas on half the side of the opposite axial cooling gas passage regions of the heat exchangers, thus subdividing the cooling gas stream into two halves with opposite flow directions. The partial transfer of the cooling gas stream halves to the entire width of the axial cooling gas passage areas of the heat exchangers provides turbulence and a distribution of the cooling gas for uniform cooling also in the event of a failure of one heat exchanger.

7 Claims, 3 Drawing Sheets

ELECTRIC MACHINE WITH A CLOSED COOLING LOOP

BACKGROUND OF THE INVENTION

The present invention relates to an electric machine with a closed cooling loop having a gaseous coolant which is subdivided by means of partitions and baffles over at least two heat exchangers, where the cooling gas leaves the outside surface of the stator lamination stack of the machine radially and the two heat exchangers are arranged on the upper and/or lower side of the machine, respectively, perpendicularly to it longitudinal axis.

From DE-AS No. 10 65 074, such an electric machine with a closed cooling loop having a gaseous coolant is known, in which the cooled-down cooling gas approaches the end faces of the stator and the rotor of the electric machine on both sides, mainly axially. The known electric machine has axial canals about the machine shaft as well as radial cooling canals in the stator and the rotor. By means of baffles and partitions, the cooling gas stream is divided over the interior of the machine and the coil head zones at both end faces of the stator and the rotor and are fed to a heat exchanger arranged below the stator lamination stack. The axial length of the heat exchanger is designed so that the heat exchanger extends on both sides beyond the stator lamination stack in the axial direction and covers the respective coil head zones.

For the return of the cooling gas from the heat exchanger, a canal formed by the partitions and the walls of the machine body proper as well as of the housing is provided. In the known electric machine the separation of the sub-streams of the entire cooling gas stream up to the entrance of the cooling gas into the heat exchanger is assured by additional radial partitions. Mixing of the cooling gas sub-streams is possible only after the cooling gas leaves the heat exchanger. For the cooling gas sub-streams conducted over the coil head zones, only parts of the heat exchanger alone are thus available. Thereby, an intensification of the cooling of the cooling gas sub-streams conducted over the coil head zones is achieved.

In the event of a failure or shutdown of the heat exchanger for cleaning purposes, the operation of the machine must be interrupted, however, since the necessary cooling of the cooling gas is no longer assured.

It is further known from DE-AS No. 27 24 422 to permit a very brief failure of a heat exchanger by providing two separate identical heat exchangers which are arranged side by side perpendicularly to the longitudinal axis of the electric machine, so that at least inspection work can be performed during operation. In the case of trouble or for more extensive service work also on only one heat exchanger, it has been necessary heretofore to shut down the machine because one heat exchanger alone can handle only about one-half of the cooling air heated by the machine, and always leaves the other half of the machine uncooled.

SUMMARY OF THE INVENTION

It is an object of the present invention to provide in an electric machine with heat exchangers arranged on its upper or lower side guidance for the cooling gas by means of baffles and partitions which accomplishes uniform cooling also if one heat exchanger fails.

The above and other objects of the invention are achieved by an electric machine having a closed cooling loop containing a gaseous coolant which loop is subdivided by means of partitions and baffles over at least two heat exchangers where the cooling gas leaves the outside surface of the stator lamination stack of the machine radially and the two heat exchangers, are arranged on the upper and/or lower side of the machine, respectively, perpendicularly to its longitudinal axis, the entire cooling gas stream being divided by baffles disposed adjacent to the heat exchangers into two cooling gas substreams with opposite flow directions due to opposite unidirectional blocking of one-half the axial passage areas at the end face, which are then distributed over the entire width of the axial passage areas at the end face.

The entire heated cooling gas leaving the external surface of the stator lamination stack is collected along the circumference within the encapsulation and brought together on the upper or lower side of the machine to enter the heat exchangers. To this end, the cooling gas brought together in this manner is conducted in the vertical direction perpendicularly to the longitudinal axis of the electric machine upwards or downwards through a cooling gas passage area defined by the lateral surfaces of the housing and the upper edges of the stator lamination stack at the end face. After the cooling gas has passed through the cooling gas passage area, it is deflected and discharged through the axial passage areas for the cooling gas at the end faces of the stator lamination stack defined by the side walls and the cover area of the housing as well as by the stator lamination stack. The heat exchangers can be arranged here in the vertical cooling gas passage area as well as also laterally beside the stator lamination stack in the axial cooling gas passage areas perpendicularly to the longitudinal axis of the electric machine.

According to the invention, the axial passage areas for the cooling gas are blocked by baffles arranged between the vertical cooling gas passage areas and the housing wall, always offset relative to each other halfways for the axial passage of the cooling gas at one of the end faces of the electric machine.

Without the baffles and the halfway blocking of the axial passage areas at the end faces caused by them, the cooling gas leaving the vertical cooling gas passage area would get divided into two half-streams associated with the end faces over the full width of the axial passage areas to the end faces of the electric machine an enter from there again mainly axially the electrically active part of the electric machine. By the halfway blocking of the axial passage areas at the end face accomplished by means of the baffles, the vertical cooling gas passage-area is divided into two halves which are located laterally beside the longitudinal axis of the electric machine and in which the cooling gas flows side by side in opposite directions to the axial passage area opposite the blocking at the end faces of the stator lamination stack.

At the boundaries of the cooling gas sub-streams flowing in opposite directions, turbulence then occurs which causes, after overcoming the other blocking baffle, a distribution of the respective half cooling gas stream over the entire axial cooling gas passage areas at the end face.

By this subdivision of the cooling gas leaving the stator lamination stack radially, oriented laterally to the longitudinal axis, and its turbulence as well as partially diagonal transfer to the side of the electric machine located on the respective other side of the longitudinal axis, it is made possible in an advantageous manner to distribute the cooling gas stream over several revolutions in the cooling loop uniformly over the entire volume of the electric machine to be cooled and to distribute it alternatingly over the two heat exchangers. Thereby, a uniform, even if weaker, cooling action of the entire circulating cooling gas volume is obtained even if the one of the two heat exchangers arranged perpendicularly to the longitudinal axis of the machine fails.

This prevents local overheating of the electric machine and operation can then be maintained with reduced performance at least if one of the heat exchangers fails.

It is of advantage to make the baffles so that they can be flipped. At least in the event or a failure of shutdown of one of the heat exchangers, the baffles are flipped into the position provided for the distribution of the cooling gas and cause uniform cooling of the electric machine also with only one heat exchanger operative. On the other hand, the baffles provided for the distribution of the cooling gas stream in normal, trouble-free operation can be flipped against the housing walls so that in normal operation, flow losses caused by the baffles are avoided and thereby, the throughput of secondary coolant can he reduced.

It is advantageous that the heat exchangers are arranged in the axial direction beside the stator lamination stack and the baffles are disposed between the outer surface of the stator lamination stack and the cooling gas passage areas of the heat exchangers. Thereby, the overall height of the electric machine can be kept small and at the same time, access to the heat exchangers from the end faces can be made possible, which can be advantageous for certain applications. With this arrangement of the heat exchangers beside the stator lamination stack, it is advisable to provide baffles which extend from the end face of the stator lamination stack to the cover surface of the housing. Thereby, a simple adaptation of the baffles to the available space between the stator lamination stack and the cover surface of the housing as well as to the passage areas of the heat exchangers is provided by means of geometrically simply shaped, panel-like baffles.

It may furthermore be advantageous to provide staircase-like baffles with horizontal subsurfaces located at half the height of the cooling gas passage areas of the heat exchangers, the axial length of which corresponds to one-half the length of the stator lamination stack of the electric machine, where one vertical subsurface extends from the edges, respectively facing a heat exchanger of the horizontal subsurface of each baffle to the end face of the stator lamination stack and the respective other vertical subsurface extends from the edge of the horizontal subsurface of each baffle facing away from a respective heat exchanger to the cover surface of the housing.

With this arrangement, blocking and turbulence likewise take place on half the side and thereby, partial transfer of the cooling gas passing through the vertical cooling gas passage area to the entire width of the axial passage surfaces at the end faces similar to the arrangement with oblique baffles. However, the baffles consist here of two vertical and one horizontal subsurface which make a right angle to each other. The vertical subsurfaces directed downward from the horizontal subsurfaces are disposed oppositely here in a lower lateral half of the half-sided axial passage areas diagonally closely in front of the heat exchangers. The subsurfaces which are directed vertically upward from the horizontal subsurfaces, on the other hand, are located directly next to each other in the center of the upper half of the space above the vertical cooling gas passage area and block this space in the axial direction at one-half the height from the cover surface of the housing.

Thereby the baffles associated with each half of the vertical cooling gas passage area of the electric machine cover each time only about one quarter of the total available vertical cooling gas passage area. The space above the vertical cooling gas passage for the cooling gas thus extends in part to the cover surfaces of the housing so that thereby, flow losses in the axial direction are reduced and the cooling effect of the heat exchangers arranged axially beside the stator lamination stack is increased.

It is possible to arrange the heat exchangers in the vertical cooling gas passage area of the electric machine beside each other. For this purpose it is advisable that vertically arranged, S-shaped baffles cut the cooling gas passage area of both heat exchangers in half in the axial direction. By this arrangement of the heat exchangers, the axial extent of the upper sub-region of the machine is reduced and a more compact design is made possible. In the case that the cooling gas exits from the stator lamination stack directly into the heat exchangers, an immediate cooling down of the cooling gas and a reduction in the heating of the housing and thereby, of the environment, as well as an improvement of the sound insulation are possible. Furthermore, the pipelines provided for the secondary cooling of the heat exchangers can be made with a short length.

By the vertical, S-shaped baffles, uniform cooling of the entire electric machine is assured with this arrangement of the heat exchangers if one heat exchanger fails. In addition, it is advisable that the vertical, S-shaped baffles extend from the cooling gas passage area of the heat exchangers to the cover area of the housing. Thereby, cross currents to the axial flow of the cooling gas obtained by the baffles in the region adjacent to the heat exchangers can be avoided and better utilization of the cooling gas volume can be achieved, with at the same time, a lower overall height of the machine.

BRIEF DESCRIPTION OF THE DRAWINGS

In the following, the invention will be explained in greater detail, referring to the embodiments shown in the drawings in which:

FIG. 4 shows the top view of a cooling gas distribution hood, designed as a separate part, with baffles located therein, and FIG. 3 shows a cross section along the line III—III in FIG. 4.

DETAILED DESCRIPTION

Figure 1:
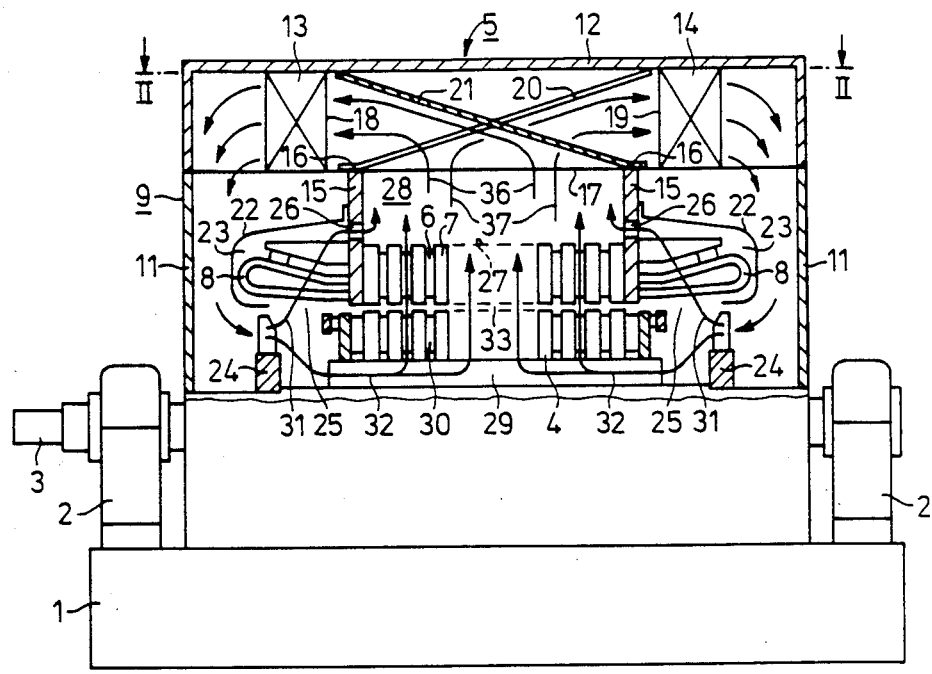
FIGS. 1 and 2, show an electric machine in a side view and in a top view respectively, partly in cross section, in which the heat exchangers are arranged beside the stator lamination stack in the axial direction.
Figure 2:
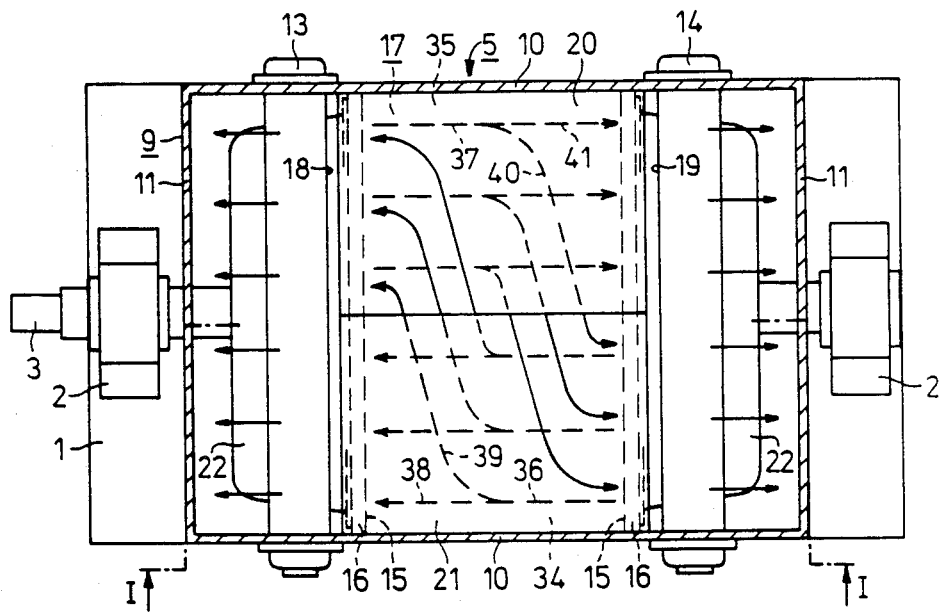

The embodiment according to FIGS. 1 and 2 relates to an electric machine, particularly a motor of large power rating, having a closed cooling loop. The motor is mounted on a base plate 1. The base plate 1 further carries the bearings 2 for the shaft 3 of the rotor 4, and the stator 5. The latter consists of the stator lamination stack 7 crossed by radial stator cooling canals 6; the stator winding with the coil heads 8; and the housing 9. The housing 9 is formed by the side walls 10, the end face walls 11 and the upper cover surface 12. It is of closed design and defines the interior, in which the cooling gas flow circulates. Below the cover surface 12, heat exchangers 13, 14 are arranged on the upper side of the electric machine, which are disposed in the axial direction beside the stator lamination stack 7.

At the end faces of the stator lamination stack 7, partitions 15 are arranged which extend, except for the upper side of the machine, to the side walls 10 and on the other side, to the base plate 1. The upper edges of the partitions 15 extend parallel to the cover surface 12 and have a distance therefrom corresponding to the height of the heat exchangers 13, 14. These upper edges 16 and the two side walls 10 of the housing 9 which are perpendicular to the partitions, define the cooling gas passage area 17, through which the entire heated cooling gas is fed to the heat exchangers 13, 14, the former being deflected to the axial cooling gas passage areas 18, 19, located in their entrance surfaces. The axial cooling gas passage areas 18, 19 have the height of the heat exchangers 13, 14 and the width of the upper edges 16 of the partitions 15.

In the space between the vertical cooling passage area 17 and the two axial cooling gas passage areas 18, 19 with the heat exchangers 13, 14, baffles 20, 21 are arranged, the width of which correspond to one-half the width of the upper edges 16 of the partitions 15. The baffles 20, 21 are arranged beside each other laterally in the longitudinal axis of the electric machine with opposite inclination and extend at an angle from the upper edges 16 of the partitions 15 to the upper cover surface 12 of the housing 9. Thereby, they block halfway the access to the axial cooling gas passage areas 18, 19. Such an arrangement of the heat exchangers 13, 14 with the baffles 20, 21 is likewise possible on the underside of the electric machine.

The coil heads 8 are covered by the guiding hoods 22 and limit the coil head space 23 at the end faces of the electric machine. The guiding hoods 22 are brought radially from the partitions 15 to the axial fans 24 mounted on both sides to the shaft 3 and have an annular gap 25 adjacent to the latter. In the partitions 15, cutouts 26 distributed over the circumference are provided which connect the coil head spaces 23 to the hot-gas space 28 which is defined by the external surface 27 of the stator lamination stack 7, the partitions 15 and the housing 9. In the interior of the rotor 4, the shaft 3 is surrounded by axial tubular canals 29 which are connected to the radial rotor cooling canals 30 provided in the rotor lamination stack.

The cooling gas cooled by the heat exchangers 13, 14 is conducted to the axial fans 24 around the guiding hoods 22. A cooling gas substream 31 indicated by arrows is conducted by the axial fans 24 over the coil heads and enters, after they are cooled into the hot-gas space 28 via the passage openings 26 in the partitions 15. The substantially larger cooling gas substream 32, likewise indicated by arrows flows through the lamination stack in the axial tubular canal 29 and enters, aided by the blower effect of the rotor 4, the radial rotor cooling canals 30 of the latter. From these it then gets into the radial stator cooling canals 6 via the gas gap 33.

In this manner, the dissipation (loss) heat is removed from the rotor 4 and the stator lamination stack 7. The cooling gas substream 32 leaves the external surface 27 of the stator lamination stack 7, distributed over the circumference and is brought together in the hot-gas space 28 with the cooling gas substream 31 conducted over the coil heads. The entire heated cooling gas is then conducted tangentially along the external surface 27 of the stator lamination stack 7 within the hot-gas space 28 to the vertical cooling gas passage surface 17 and arrives through the latter at the baffles 20, 21.

In the following, the respective cooling gas substreams are indicated by corresponding arrows. The vertical cooling gas passage area 17 is divided into two halves which are associated with the two baffles 20, 21 and through which the cooling gas substreams 36, 37 pass. The cooling gas substream 36 passing through the half 34 of the vertical cooling gas passage area 17 meets the associated baffle 21 and is conducted to the heat exchanger 13 mainly along this baffle 21.

The cooling gas substream 37 passing through the other half 35 of the vertical cooling gas passage area 17 is associated with the baffle 20 and is deflected by the latter in the opposite direction beside the cooling gas substream 36 to the heat exchanger 14.

By the baffles 20, 21, the two cooling gas substreams 36, 37 are thus conducted side by side in opposing directions to the opposite axial passage areas 18, 19, in which the heat exchangers 13, 14 are disposed. As shown in FIG. 1, cooling gas substream 36, 37 flow through the respective heat exchangers 13, 14 such that the direction of flow is parallel to the longitudinal axis of the machine.

At the boundary of the two cooling gas substreams 36, 37, intensive turbulence is generated. A cooling gas substream 39 of the cooling gas substream 36 gets here into the space above the baffle 20 with the opposite inclination on the other side of the longitudinal axis of the machine and enters the heat exchanger 13 there. The other cooling gas substream 38 of the cooling gas substream 36 is not deflected and can get through the heat exchanger 13 directly. The other cooling gas substream 37 likewise has turbulence at the boundary of the cooling gas substream 36 which flows at the boundary in opposite direction, so that its cooling gas substream 40 gets to the side beyond the longitudinal axis of the machine to the heat exchanger 14, while its cooling gas substream 41 can pass through it directly. Thereby, the entire cooling gas stream which passes through the vertical cooling gas passage surface 17 is distributed over the entire width of both heat exchangers 13, 14, mixed.

Through this distribution and intensive turbulence of the cooling gas, sufficient cooling action is ensured also in the event of a failure of one of the heat exchangers 13, 14, at least for partial load operation. In addition, it would be possible to achieve from the start an improvement of the cooling for the entire machine by overdesign of the heat exchangers 13, 14, or, if required, by increasing the throughput of the secondary coolant also if one heat exchanger 13, 14 fails.

Figure 3:
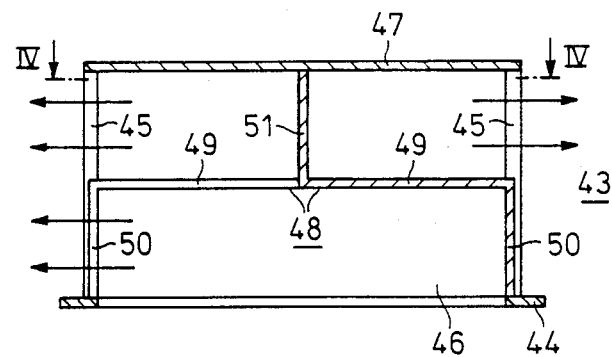
FIGS. 3 and 4 show side and top views of another embodiment with heat exchangers arranged beside the stator lamination stack in the axial direction, and, in particular.
Figure 4:
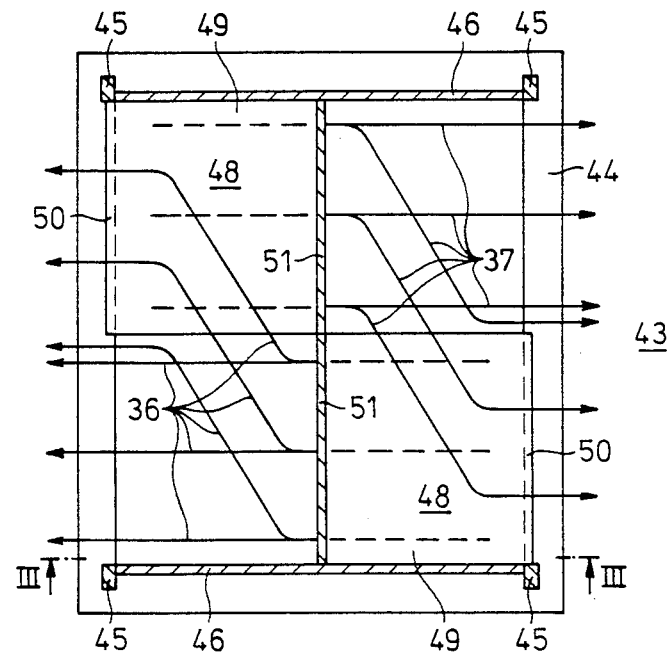

Another embodiment of the invention with a modified arrangement of the baffles as a separately realized cooling gas distribution hood 43 is shown in FIGS. 3 and 4.

The space above the vertical cooling gas passage area 17 which is located between the two heat exchangers 13, 14 and is bounded by the side walls 10 and the cover surface 12 is designed here as a separate structural part, namely, as a cooling gas distribution hood 43. The latter consists of a base frame 44, the supports 45, the side walls 46, a segment 47 of the cover surface 12 and staircase-shaped baffles 48. The base area of the air distribution hood 43 corresponds here to the vertical cooling gas passage area 17. The distribution and turbulence of the cooling gas substreams 36, 37, leaving their two halves 34 and 35 are analogous to the embodiment shown in FIGS. 1 and 2 with baffles 18, 19 set at an angle.

The baffles 48 are composed of staircase-like subsurfaces 49, 50, 51 respectively, which are perpendicular to each other. The respective horizontal subsurfaces 49 are here at one-half the height of the axial cooling gas passage areas 18, 19, of the heat exchangers 13, 14, not shown, which are directly adjacent thereto after the cooling gas distribution hood 43 is installed. The axial length of the horizontal subsurfaces 49 corresponds to one-half the length of the vertical cooling gas passage area 17 and thereby to one-half the axial length of the stator lamination stack 7 of the electric machine. The downward-directed vertical subsurfaces 50 face the respective heat exchangers 13, 14 and extend from the respective horizontal subsurfaces 49 downward to the base frame 44. The upward-directed vertical subsurfaces 51 facing away from the heat exchangers 13, 14 extend from the horizontal subsurface 49 upward toward the segment 47 of the cover surface of the cooling gas distribution hood 43 supported by means of the supports 45.

Due to this arrangement of the baffles 48 in separate structural part, they can, on the one hand, be installed separately from the assembly of the housing of the electric machine and for servicing, a fast disassembly of the baffles 20, 21 is possible by lifting the complete air distribution hood 43 up and by thereby providing fast access to the electrically active part of the electric machine. In this embodiment of the cooling gas distribution hood 43, the cooling gas flow can arrive at the upper part of the cooling gas distribution hood 43 considerably earlier than with inclined baffles 20, 21, so that the cooling gas, upon entering the heat exchangers 13, 14, has already largely laminar flow and thereby the flow resistance is lowered additionally.

Figure 5:
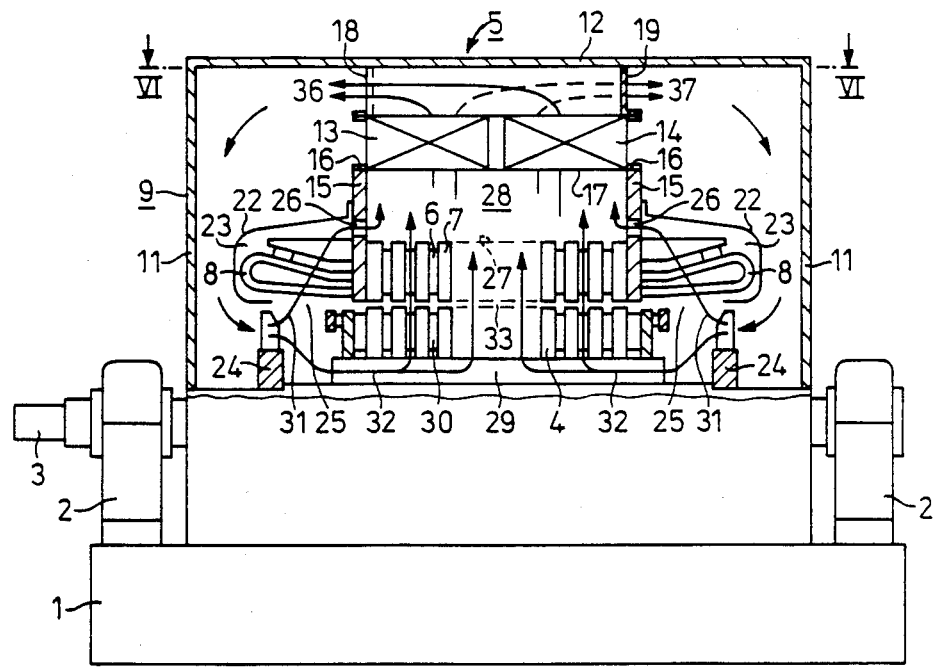
FIGS. 5 and 6 show another electric machine with heat exchangers arranged next to each other in the vertical cooling gas passage surface of the electric machine, likewise in a partly cross sectional presentation in a side view and a top view.
Figure 6:
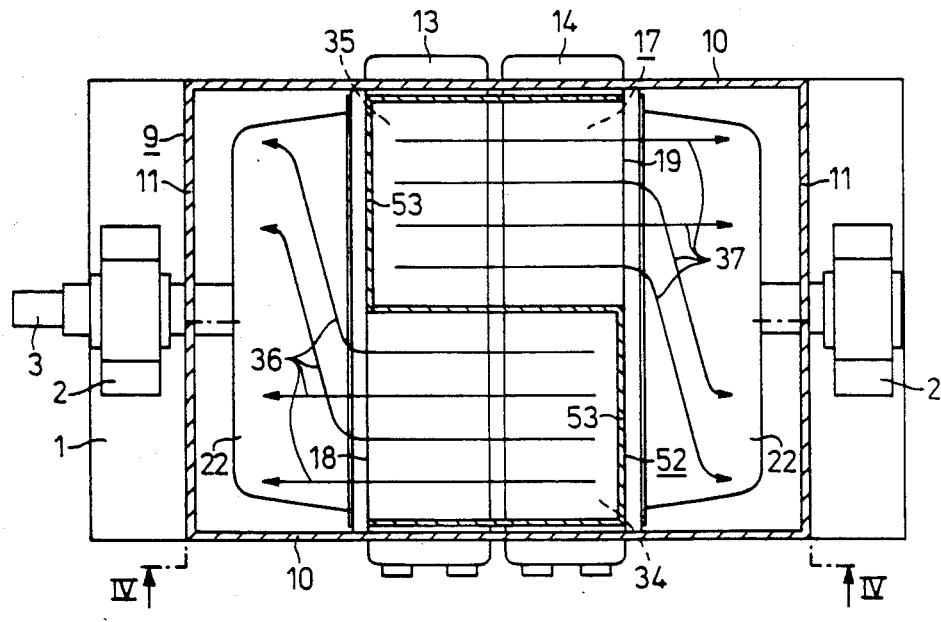

FIGS. 5 and 6 show a further embodiment of the invention with a modified arrangement of the heat exchangers 13, 14 with the same cooling loop. The same reference symbols have been retained for the same parts as in the embodiment shown in FIGS. 1 and 2.

The heat exchangers 13, 14 arranged perpendicularly to the longitudinal machine axis are disposed side by side in the vertical cooling gas passage area 17 of the electric machine. The heated cooling gas leaving the external surface 27 of the stator lamination stack 7 is thereby conducted to the heat exchangers 13, 14 directly and is divided from the baffles 52 to the axial cooling gas passage areas 18, 19, only after passage through the heat exchangers 13, 14.

On the heat exchangers 13, 14, the vertical baffles 52 are arranged which cut the vertical cooling gas passage area 17 in half likewise into the subsurfaces 34 and 35. S-shaped baffles 52 extend from the upper surface of the heat exchangers 13, 14 to cover surface 12 of the housing. The axial cooling gas passage areas 18, 19, are blocked on half the side by the subsurfaces 53 arranged perpendicularly to the longitudinal axis of the machine similarly to the first embodiment. The cooling gas is thereby divided into two cooling gas substreams 36, 37 associated with the halves 34, 35 of the vertical cooling gas passage area 17 which pass through the axial cooling gas passage areas 18, 19 which are blocked on one-half the side.

Behind this is located the space of the control hoods 22 covering the coil heads 8, the width of which corresponds to the total width of the axial cooling gas passage areas 18, 19. Each cooling gas substream 36, 37 is therefore fanned out over this total width.

In the event of failure, for instance, of the heat exchanger 13, only one-half the quantity of the cooling gas substream 36, 37 is cooled. Since each cooling gas substream 36, 37 is distributed, however, over the entire width of the machine, so good a mixing of the cooling gas is obtained during the passage of the cooling gas through the entire machine that overall, uniform cooling action is developed. In the described embodiments air is used as a rule as the cooling gas and in exceptional cases hydrogen.

In the foregoing specification, the invention has been described with reference to specific exemplary embodiments thereof. It will, however, be evident that various modifications and changes may be made thereunto without departing from the broader spirit and scope of the invention as set forth in the appended claims. The specification and drawings are, accordingly, to be regarded in an illustrative rather than in a restrictive sense.

What is claimed is:

1. An electric machine disposed in a housing having a closed cooling loop containing a gaseous coolant in communication with at least two heat exchangers having coolant passage areas, where the gaseous coolant leaves an outside surface of a stator lamination stack of the machine radially and the two heat exchangers are arranged on at least one of an upper and lower side of the machine and the cooling loop has two axial passage areas, arranged to allow gaseous coolant to flow axially parallel to a longitudinal axis of the machine, the cooling loop being divided by baffles disposed adjacent to the heat exchangers into two gaseous coolant substreams with opposite flow directions due to opposite unidirectional blocking of one-half the axial passage areas by the baffles, said gaseous coolant substreams then being distributed over the entire width of the axial passage areas.

2. The electric machine recited in claim 1, wherein the baffles are designed so that they can be flipped, thereby to allow all the gaseous coolant to flow through one of the heat exchangers in the event of a failure of a heat exchanger.

3. The electric machine recited in claim 1, wherein the heat exchangers are arranged in an axial direction of the machine beside the stator lamination stack and the baffles are disposed between an external surface of the stator lamination stack and the coolant passage areas of the heat exchangers.

4. The electric machine recited in claim 1, wherein the baffles comprise inclined baffles which extend from an end face of the stator lamination stack to a cover surface of the housing.

5. The electric machine recited in claim 3, wherein each baffle comprises a staircase-like baffle with a horizontal subsurface disposed at one-half the height of the coolant passage areas of the heat exchangers, the axial length of the baffles corresponding to one-half the length of the stator lamination stack of the electric machine, the baffles having two vertical subsurfaces, one vertical subsurface extending from an edge of the horizontal subsurface of each baffle facing a respective heat exchanger toward the stator lamination stack and the other vertical subsurface extending from an edge of the horizontal subsurface of each baffle facing away from a respective heat exchanger to a cover surface of the housing.

6. The electric machine recited in claim 1, wherein a vertical gaseous coolant passage area is provided adjacent the stator lamination stack and the heat exchangers are arranged in the vertical gaseous coolant passage area side by side, the baffles comprising vertical, S-shaped baffles which cut the coolant passage areas of both heat exchangers in half in an axial direction of the heat exchangers.

7. The electric machine recited in claim 6, wherein the vertical, S-shaped baffles extend from a surface of the heat exchangers to a cover surface of the housing.

* * * * *